United States Patent [19]

Yamazaki et al.

[11] Patent Number: 5,440,733

[45] Date of Patent: Aug. 8, 1995

[54] TOKEN TRAIN RETRIEVAL DEVICE FOR SIMULTANEOUSLY DETERMINING NEST LEVEL AND CHECKING CONDITION OF RETRIEVAL BASED ON THE DETERMINING NEST LEVEL

[75] Inventors: Tetsuya Yamazaki; Kousuke Takahashi, both of Tokyo, Japan

[73] Assignee: NEC Corporation, Tokyo, Japan

[21] Appl. No.: 98,076

[22] Filed: Jul. 28, 1993

[30] Foreign Application Priority Data

Jul. 28, 1992 [JP] Japan .................. 4-200731

[51] Int. Cl.⁶ .................. G06F 15/00; G06F 7/04
[52] U.S. Cl. .................. 395/600; 395/775; 395/200.01; 364/942.8; 364/940.8; 364/940.1; 364/940
[58] Field of Search .................. 395/600, 775, 200

[56] References Cited

U.S. PATENT DOCUMENTS

| | | | |
|---|---|---|---|
| 4,747,100 | 5/1988 | Roach et al. | 370/86 |
| 4,750,114 | 6/1988 | Hirtle | 364/200 |
| 4,916,660 | 4/1990 | Takahashi | 364/900 |
| 5,210,827 | 5/1993 | Takahashi et al. | 395/200 |
| 5,293,629 | 3/1994 | Conley et al. | 395/700 |
| 5,293,634 | 3/1994 | Takahashi et al. | 395/800 |

FOREIGN PATENT DOCUMENTS

| | | |
|---|---|---|
| 0298520 | 1/1989 | European Pat. Off. |
| 0431588 | 6/1991 | European Pat. Off. |
| 0435260 | 7/1991 | European Pat. Off. |

OTHER PUBLICATIONS

Takada, "An FDDI Bridge for the High–Speed Multimedia Backbone LAN", 1990 IEEE, pp. 399–404.
W. Stallings, "Data and Computer Communications", Protocols and Architectures, Chapter 12, 1985, pp. 394–408.
William Stallings, PhD, "Data and Computer Communications", Ed. 2, Mac Millan Publishing, N.Y. pp. 389–409.

Primary Examiner—Thomas C. Lee
Assistant Examiner—Rehana P. Krick
Attorney, Agent, or Firm—Foley & Lardner

[57] ABSTRACT

In a token train retrieval device including a memory device (24) for memorizing a plurality of tokens each of which starts at a starting address and ends at an end address and each of which has a nest level selected from a plurality of nest levels and comprises a header and a data set where header comprises a data length code and a data identifier code including a nest bit, a retrieval condition memory (25) memorizes a retrieval condition including a plurality of designated nest level codes and a plurality of designated identifier codes. A header register (26) holds the data length code, the data identifier code, and the nest bit as a held data length code, a held data identifier code, and a held nest bit. Responsive to the held data length code, a supplied header, and a decided nest level code, a checking circuit (27) produces a matching signal when the retrieval condition is satisfied. An intra-train address generating circuit (29) generates an intra-train address variable in accordance with the matching signal and the held data length code. Supplied with the intra-train address and the held data length code, an end address calculating circuit (30) calculates the end address of each token as a calculated address. Responsive to the intra-train address, the calculated address, and the held nest bit, a nest level decision circuit (31) supplies the checking circuit with the decided nest level code indicative of one of the nest levels.

8 Claims, 10 Drawing Sheets

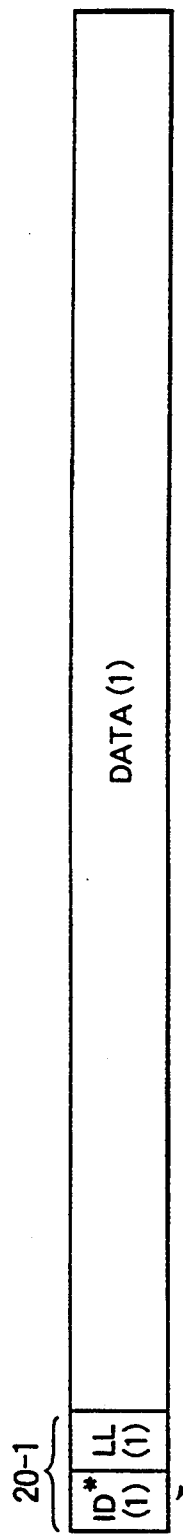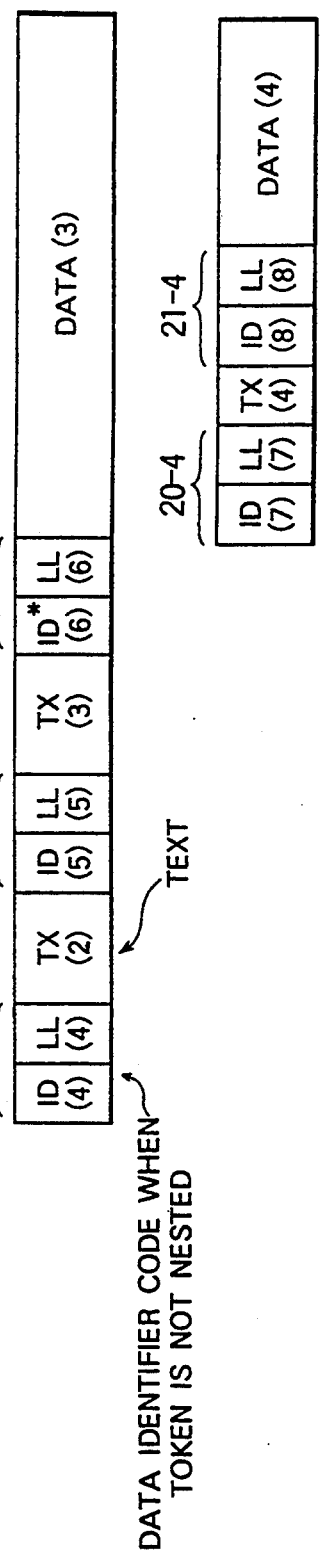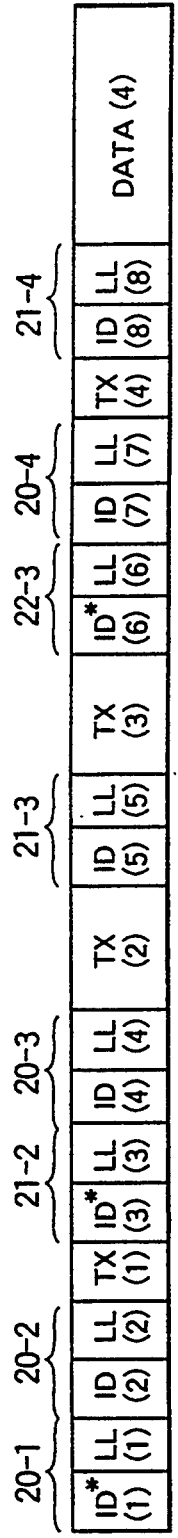
FIG. 1(a) FIG. 1(b) FIG. 1(c) FIG. 1(d) FIG. 1(e)

TOKEN TRAIN RETRIEVAL DEVICE FOR SIMULTANEOUSLY DETERMINING NEST LEVEL AND CHECKING CONDITION OF RETRIEVAL BASED ON THE DETERMINING NEST LEVEL

BACKGROUND OF THE INVENTION

This invention relates to a token train retrieval device for retrieving tokens including multi-media information which is communicated between heterogeneous data processing systems.

The token train retrieval device is for use in processing of protocol conversion between the heterogeneous data processing systems, processing of protocol analysis therebetween, hypertext search, retrieval of a multi-media data base, or the like. The token train retrieval device is necessary to communication and retrieval of the multi-media information between the heterogeneous data processing systems which are connected one another in an information communication network. The information communication network is built on the basis of a network architecture systematized according to a protocol.

Inasmuch as such a protocol has been originally developed by each of computer makers, it is impossible to carry out information interchange between the heterogeneous data processing systems. In order to solve this problem, a standard protocol has been established by International Organization for Standardization (ISO). This standard protocol is called a layer protocol of Open Systems Interconnection (OSI) in the art. Such a layer protocol is disclosed in a book written by William Stallings and published 1985 by Macmillan Publishing Company, New York, under the title of "DATA AND COMPUTER COMMUNICATIONS", pages 394 to 408, Chapter 12.

The layer protocol consists of seven layers which comprises a physical layer, a data link layer, a network layer, a transport layer, a session layer, a presentation layer, and an application layer. Each layer of the layer protocol has a processing function which should be standardized between the computer makers. Inasmuch as the layer protocol of the OSI is well-defined, it is possible to carry out protocol conversion between the layer protocol and a specific protocol developed by a particular computer maker. Each of the heterogeneous data processing systems comprises a protocol conversion system which carries out the protocol conversion. By the protocol conversion, it is possible to carry out the information interchange between the heterogeneous data processing systems.

Attention will be directed to the application layer. As is known in the art, the application layer is divisible into first through N-th sublayers where N represents a predetermined natural number which is equal to, for example, sixty-four. The first through the N-th sublayers are referred to first through N-th nest levels, respectively, in the art. The first through the N-th nest levels are a lowest through a highest nest level, respectively. According to the application layer, data transmission is carried out between the heterogeneous data processing systems on the basis of Message Handling Systems (MHS) recommended by the International Telegraph and Telephone Consultive Committee (CCITT) Recommendation X.409.

More specifically, the multi-media information is transmitted between the heterogeneous data processing systems as a plurality of tokens. Each of the tokens is given by a nest level selected from the first through the N-th nest levels as a selected level. Each of the tokens comprises a header and a data set as described in Chapter 12 of the above-mentioned book. The data set has a data length and is for nesting one of the tokens that has a higher nest level than the selected level and will be referred to as a particular token. The header comprises a data length code representative of the data length and a data identifier code. The data identifier code includes a nest bit indicative of whether or not the particular token is nested in the data set.

In a conventional token train retrieval device, the tokens are memorized in a memory device as stored tokens. Each of the stored tokens starts at a starting address and ends at an end address. In prior art, retrieval of a specific token selected from the stored tokens is carried out after the stored tokens are successively read from the memory device as read tokens and the header of each of the read tokens is decoded. The specific token has a designated nest level and the header including a designated identifier code. Both of the designated nest level and the designated identifier code are given as a retrieval condition. More specifically, a nest level of each read token is decided by decoding the header of each read token as the selected level. Subsequently, a check is made between the selected level and the designated nest level. After decision of the selected level, the retrieval of the specific token is performed by software in a computer. The conventional token train retrieval device has therefore been disadvantageous in that a long processing time is consumed to locate the specific token which satisfy the retrieval condition. As a result, it is impossible to rapidly and smoothly carry out selection of the specific token and processing of the protocol conversion.

SUMMARY OF THE INVENTION

It is an object of this invention to provide a token train retrieval device which is capable of retrieving tokens at a high speed.

It is another object of this invention to provide a token train retrieval device of the type described, which is capable of checking, simultaneously with decision of a nest level, whether or not a retrieval condition is satisfied.

It is still another object of this invention to provide a token train retrieval device of the type described, which is operable at a retrieval processing speed higher than a readout speed at which stored tokens are successively read from a memory device.

Other objects of this invention will become clear as the description proceeds.

On describing the gist of this invention, it is possible to understand that a token train retrieval device includes a memory device for memorizing, as stored tokens, a plurality of tokens each of which starts at a starting address and ends at an end address. Each of the tokens having a nest level selected from first through N-th nest levels as a selected level, where N represents a positive integer which is not less than one. The first through the N-th nest levels are a lowest through a highest nest level, respectively. Each of the tokens comprises a header and a data set. The data set has a data length and is for nesting a particular one of the tokens that has a higher nest level that the selected level. The header comprises a data length code representative of the data length and a data identifier code which includes a nest bit indicative of whether or not the particular token is nested in the data set. The token train retrieval device is for retrieving the stored tokens to locate required data in the stored tokens that satisfy a retrieval condition.

According to this invention, the token train retrieval device comprises retrieval condition memory means for preliminarily memorizing the retrieval condition as a stored condition. The stored condition includes first through M-th designated identifier codes different from one another and first through N-th designated nest level codes different from one another, where M represents a positive number which is not less than one. Each of the designated nest level codes is indicative of a designated nest level as one of the first through the N-th nest levels. A header register means is supplied as a supplied header with the header of each of selected tokens selected from the tokens and holds the data length code, the data identifier code, and the nest bit of the supplied header as a held data length code, a held data identifier code, and a held nest bit, respectively. A checking means is connected to the retrieval condition memory means and the header register means. The checking means is supplied with a decided nest level code and the supplied header. The checking means checks, in response to the held data identifier code, the decided nest level code, and the supplied header, whether or not the stored condition is satisfied to produce a matching signal indicative of a binary one when the stored condition is satisfied. An intra-train address generating means is connected to the checking means and the header register means and generates an intra-train address variable in response to the matching signal and the held data length code to select the selected tokens from the stored tokens. The selected tokens includes the required data. An end address calculating means is connected to the intra-train address generating means and the header register means and calculates the end address of each of the selected tokens as a calculated address by using the intra-train address and the held data length code. A decision means is connected to the intra-train address generating means, the end address calculating means, the header register means, and the checking means and decides a decided nest level by using the intra-train address, the calculated address, and the held nest bit. The decided nest level indicates one of the first through the N-th nest levels that is selected as the selected level. The decision means supplies the checking means with the decided nest level code representative of the decided nest level.

BRIEF DESCRIPTION OF THE DRAWING

FIGS. 1(a) through (e) show examples of tokens having different nest levels and a token train comprising the tokens;

DESCRIPTION OF THE PREFERRED EMBODIMENTS

Figure 2:
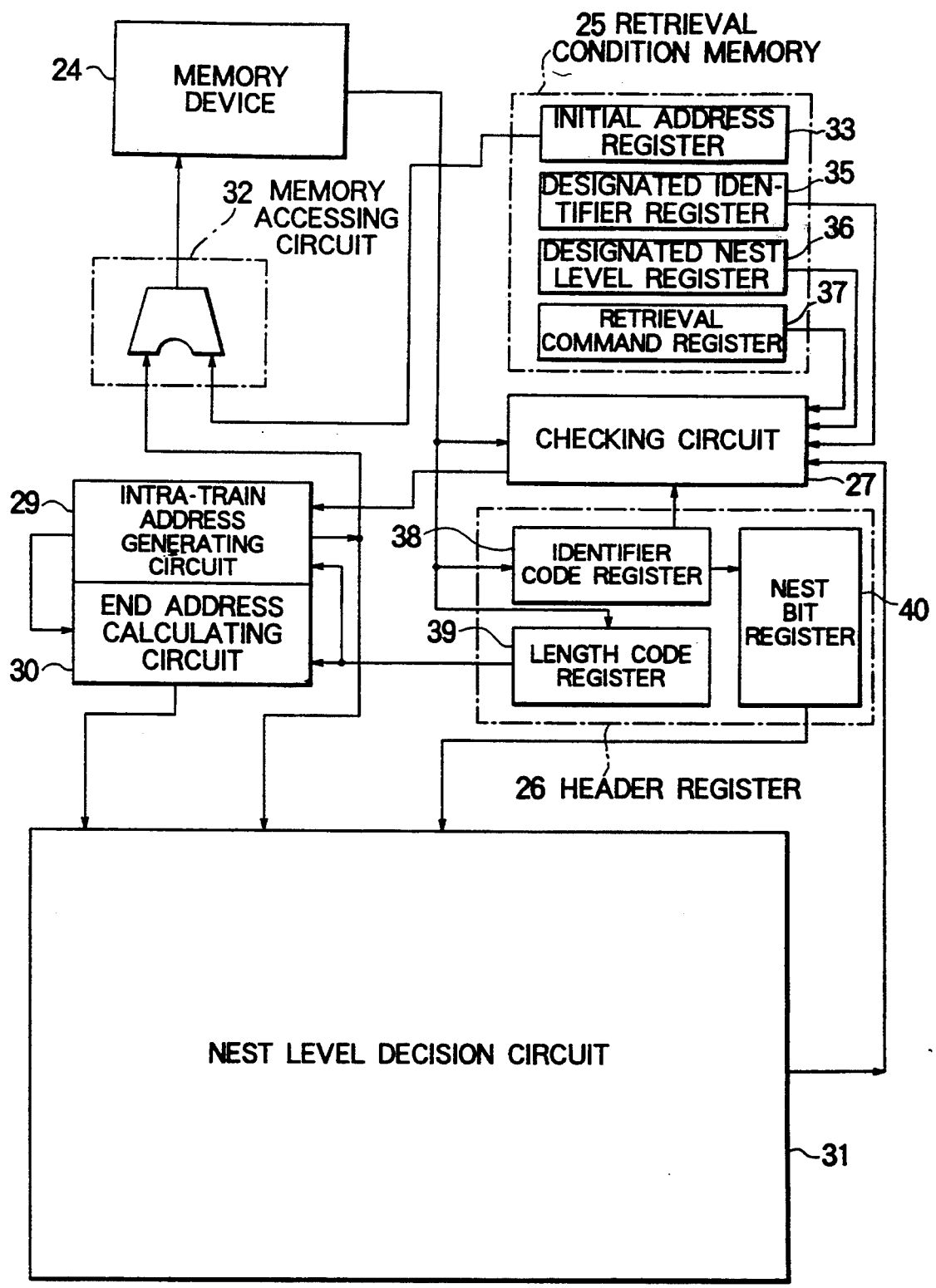
FIG. 2 is a block diagram of a token train retrieval device according to an embodiment of the present invention.

Referring to FIGS. 1(a) through (e), description will be made at first with regard to a token train transmitted between heterogeneous data processing systems (not shown). The token train comprises a plurality of tokens. Each of the tokens is given by a nest level selected from first through N-th nest levels as a selected level, where N represents a positive integer which is not less than one, for example, sixty-four. The first through the n-th nest levels are a lowest through a highest nest level, respectively.

Each of the tokens comprises a header and a data set. The data set is either data, such as DATA(1) through DATA(4), or a text, such as TX(1) through TX(4). The data DATA (suffixes omitted) may correspond to a body of a letter, which may be a business letter. The text TX (suffixes omitted) may correspond to a title or a gist of the letter. The data set has a data length and is for nesting one of the tokens that has a higher nest level than a selected level by one level and will be referred to as a particular tokens. The header comprises a data length code, such as LL(1) through LL(8), representative of the data length and a data identifier code representative of a processing function of the data set. The data identifier code consists of first through eighth bits. A sixth bit of the data identifier code is a nest bit indicative of whether or not the particular token is nested in the data set. The data identifier code is depicted at ID* (suffixes omitted) when the nest bit indicates that the particular token is nested in the data set. In this event, the nest bit may be a binary one bit. The data identifier code is depicted at ID (suffixes omitted) if the nest bit indicates that the particular token is not nested in the data set. Under the circumstances, the nest bit is a binary zero bit.

It will be assumed that tokens illustrated in FIGS. 1(a) to (d) are given first, second, third, and fourth nest levels, respectively. The first through the fourth nest levels are represented by first, second, third, and fourth nest level codes which are equal to "00", "01", "10", and "11", respectively.

In FIG. 1(a), a token having the first nest level comprises a header 20-1 in addition to the data DATA(1). The header 20-1 comprises a data identifier code ID*(1) including a nest bit of the binary one and the data length code LL(1). Therefore, the DATA(1) nests a plurality of tokens, each having the second nest level, as shown in FIG. 1(b). The token having the nest bit of the binary one such as the token illustrated in FIG. 1(a) will be called a constructor token. On the contrary, the token having the nest bit of the binary zero will be called a primitive token.

In FIG. 1(b), one of tokens that has the second nest level, comprises a header 20-2 and the text TX(1). Another of tokens that has the second nest level comprises a header 21-2 and the data DATA(2). The header 20-2 comprises a data identifier code ID(2) including a nest bit of binary zero and the data length code LL(2). The header 21-2 comprises a data identifier code ID*(3) including a nest bit of the binary one and the data length code LL(3). Therefore, the data DATA(2) nests a plurality of tokens, each having the third nest level, as shown in FIG. 1(c).

In FIG. 1(c), one of tokens that has the third nest level, comprises a header 20-3 and the text TX(2). Another of tokens has the third nest level comprises a header 21-3 and the text TX(3). Still another of tokens that has the third nest level comprises a header 22-3 and the data DATA(3). The header 20-3 comprises a data identifier code ID(4) and the data length code LL(4). The header 21-3 comprises a data identifier code ID(5) and the data length code LL(5). The header 22-3 comprises a data identifier code ID*(6) and the data length code LL(6). Therefore, the data DATA(3) nests a plurality of tokens, each having the fourth nest level, as shown in FIG. 1(d).

In FIG. 1(d), one of tokens that has the fourth nest level, comprises a header 20-4 and the text TX(4). Another of tokens that has the fourth nest level comprises a header 21-4 and the data DATA(4). The header 20-4 comprises a data identifier code ID(7) and the data length code LL(7). The header 21-4 comprises a data identifier code ID(8) and the data length code LL(8).

Referring to FIG. 1(e), the illustrated token train comprises the tokens as shown in FIGS. 1(a) to (d). It is assumed that the data length codes LL(1), LL(2), LL(3), LL(4), LL(5), LL(6), LL(7), and LL(8) are representative of data lengths L1, L2, L3, L4, L5, L6, L7, and L8, respectively. In addition, the headers 20-1, 20-2, 21-2, 20-3, 21-3, 22-3, 20-4, and 21-4 have header lengths LH1, LH2, LH3, LH4, LH5, LH6, LH7, and LH8, respectively.

It should be noted here that the data length is defined so as to make the data length comprises the header lengths. In this event, those lengths are related to one another by:

$$L1 = LH2 + L2 + LH3 + L3, \quad (1)$$

$$L3 = LH4 + L4 + LH5 + L5 + LH6 + L6, \quad (2)$$

and $$L6 = LH7 + L7 + LH8 + L8. \quad (3)$$

It is possible in general to understand that, when a token having an i-th nest level comprises a data identifier code ID*, a data length code LL(i) representative of a data length Li, and a data set DATA(i), another token having an (i+1)-th nest level is nested in the data set DATA(i), where i represents a natural number not greater than the predetermined natural number N less one. After supplied with the data set DATA(i), the nest level, namely, a selected level is returned to the i-th nest level.

In the illustrated example of FIG. 1(e), the selected level is shifted from the first nest level to the second nest level after supplied with the header 20-1. After the header 21-2 is supplied, the selected level is shifted from the second nest level to the third nest level. After the header 22-3 is supplied, the selected level is shifted from the third nest level to the fourth nest level. After the data DATA(4) is supplied, the selected level is shifted from the fourth nest level to the first nest level.

Referring to FIG. 2, a token train retrieval device according to a first embodiment of the present invention includes a memory device 24 for memorizing, as stored tokens, the tokens illustrated in FIG. 1(e). Each of the stored tokens starts at a starting address and ends at an end address. The illustrated token train retrieval device is for retrieving the stored tokens to locate required data in the stored tokens that satisfy a retrieval condition.

The memory device 24 memorizes the stored tokens which starts at an initial address. The initial address is the starting address of one of the stored tokens that should be first read from the memory device 24.

The token train retrieval device comprises a retrieval condition memory 25 for preliminarily memorizing the retrieval condition as a stored condition.

The memory device 24 is connected to a header register 26. The header register 26 is supplied as a supplied header with the header of each of selected tokens selected from the stored tokens in the manner which will later be described. The header register 26 holds the data length code, the data identifier code, and the nest bit of the supplied header as a held data length code, a held data identifier code, and a held nest bit Nb, respectively.

The retrieval condition memory 25 and the header register 26 are connected to a checking circuit 27. The checking circuit 27 is supplied with a decided nest code in the manner which will later become clear. Responsive to the held data identifier code and to the decided nest level code, the checking circuit 27 checks whether or not the stored condition is satisfied in the manner which will later become clear. The checking circuit 27 produces a matching signal Zb of a binary one when the stored condition is satisfied.

The header register 26 and the checking circuit 27 are connected to an intra-train address generating circuit 29. The intra-train address generating circuit 29 generates an intra-train address variable in response to the matching signal Zb and the held data length code to select the selected tokens from the stored tokens. The selected tokens include the required data.

Figure 3:
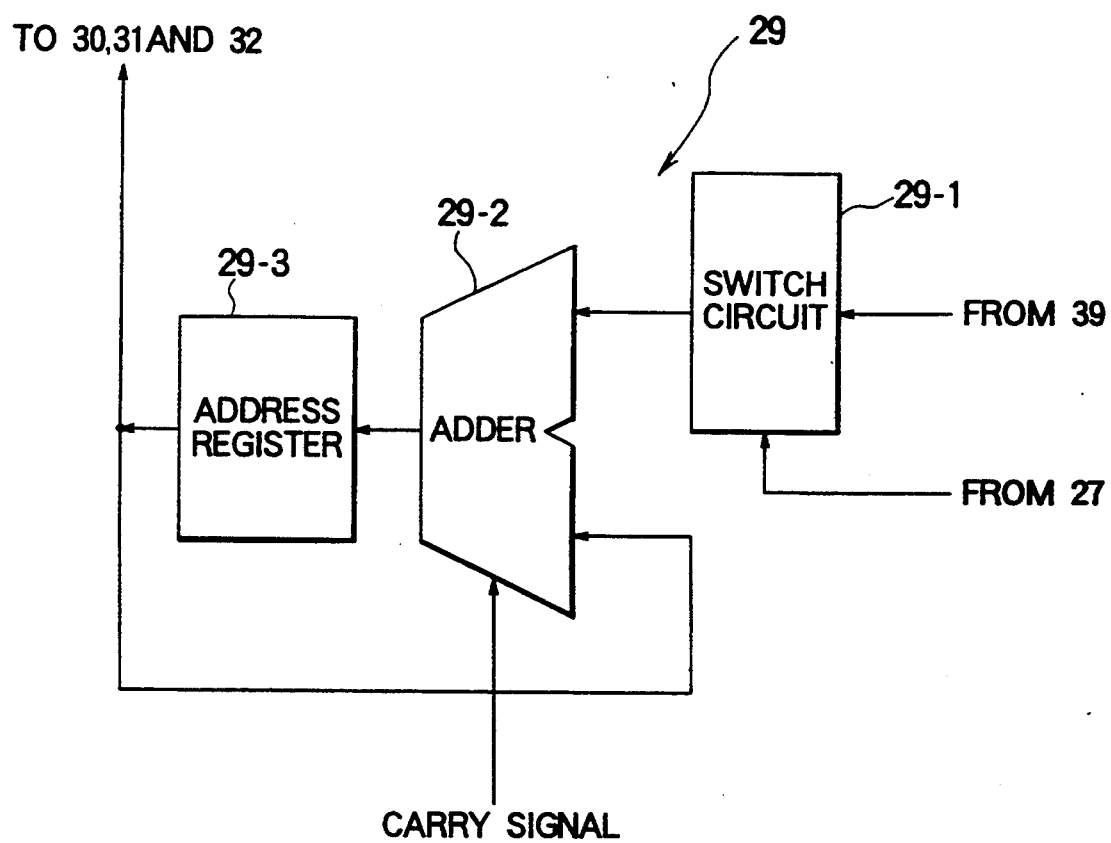
FIG. 3 is a block diagram of an intra-train address generating circuit for use in the token train retrieval device depicted in FIG. 2.

Referring to FIG. 3, the intra-train address generating circuit 29 generates the intra-train address variable to indicate a current address and later a renewed address.

The intra-train address generating circuit 29 comprises a switch circuit 29-1, an adder 29-2, and an address register 29-3.

The switch circuit 29-1 is connected to the length code register 39, the checking circuit 27, and the adder 29-2. When the matching signal Zb indicates a binary zero, the switch circuit 29-1 becomes to an on-state to supply the held data length code BL as a switched code B to the adder 29-2. When the matching signal Zb indicates a binary one, the switch circuit 29-1 turns off to supply a zero value code representative of a value zero as the switched code B.

The adder 29-2 is supplied with the intra-train address of the current address in addition to the switched code B. Supplied with a carry signal representative of the binary one, the adder 29-2 calculates a sum of the current address, the switched address, and the carry signal.

The adder 29-2 produces a sum address representative of the sum. The sum address is held in the address register 29-3 as the intra-train address of the renewed address to be supplied to the end address calculating circuit 30, the nest level decision circuit 31, and the memory accessing circuit 32.

Again referring to FIG. 2, the intra-train address generating circuit 29 and the header register 26 are connected to an end address calculating circuit 30. The end address calculating circuit 30 calculates the end address of each of the selected tokens as a calculated address by using the intra-train address and the held data length code.

The header register 26, the intra-train address generating circuit 29, the end address calculating circuit 30, and the checking circuit 27 are connected to a nest level decision circuit 31. The nest level decision circuit 31 decides a decided nest level by using the calculated address, the intra-train address, and the held nest bit. The decided nest level indicates one of the first through the N-th nest levels that is selected as the selected level. The nest level decision circuit 31 supplies the decided nest level code representative of the decided nest level to the checking circuit 27.

The intra-train address generating circuit 29, the retrieval condition memory 25, and the memory device 24 are connected to a memory accessing circuit 32. The memory accessing circuit 32 accesses the memory device 24 by an access address representative of a sum of the initial address and the intra-train address to read the selected trains.

Reviewing FIG. 1, the retrieval condition memory 25 comprises an initial address register 33, a designated identifier code register section 35, a designated nest level register section 36, and a retrieval command register section 37. The initial address register 33 preliminarily holds the initial address. The initial address register 33 is connected to the memory accessing circuit 32. The designated identifier code register 35 preliminarily holds a designated identifier code. The designated nest level register 36 preliminarily holds a designated nest level code indicative of a designated nest level as one of the first through the N-th nest levels. The retrieval command register 37 preliminarily holds a retrieval command represented by a predetermined bit pattern which designates at least one of the designated identifier code register 35 and the designated nest level register 36. All of the designated identifier code register 35, the designated nest level register 36, and the retrieval command register 37 are connected to the checking circuit 27.

The header register 26 comprises an identifier code register 38, a-length code register 39, and a nest bit flip-flop 40. The identifier code register 38 holds the data identifier code of the supplied header as the held data identifier code. The identifier code register 38 is connected to the checking circuit 27 and the nest level register 40. The length code register 39 holds the data length code of the supplied header as the held length code. The length code register 39 is connected to the intra-train address generating circuit 29 and the end address calculating circuit 30. The nest bit register 40 holds the nest bit of the supplied header as the held nest bit Nb. The nest bit register 40 is connected to the nest level decision circuit 31.

Figure 4:
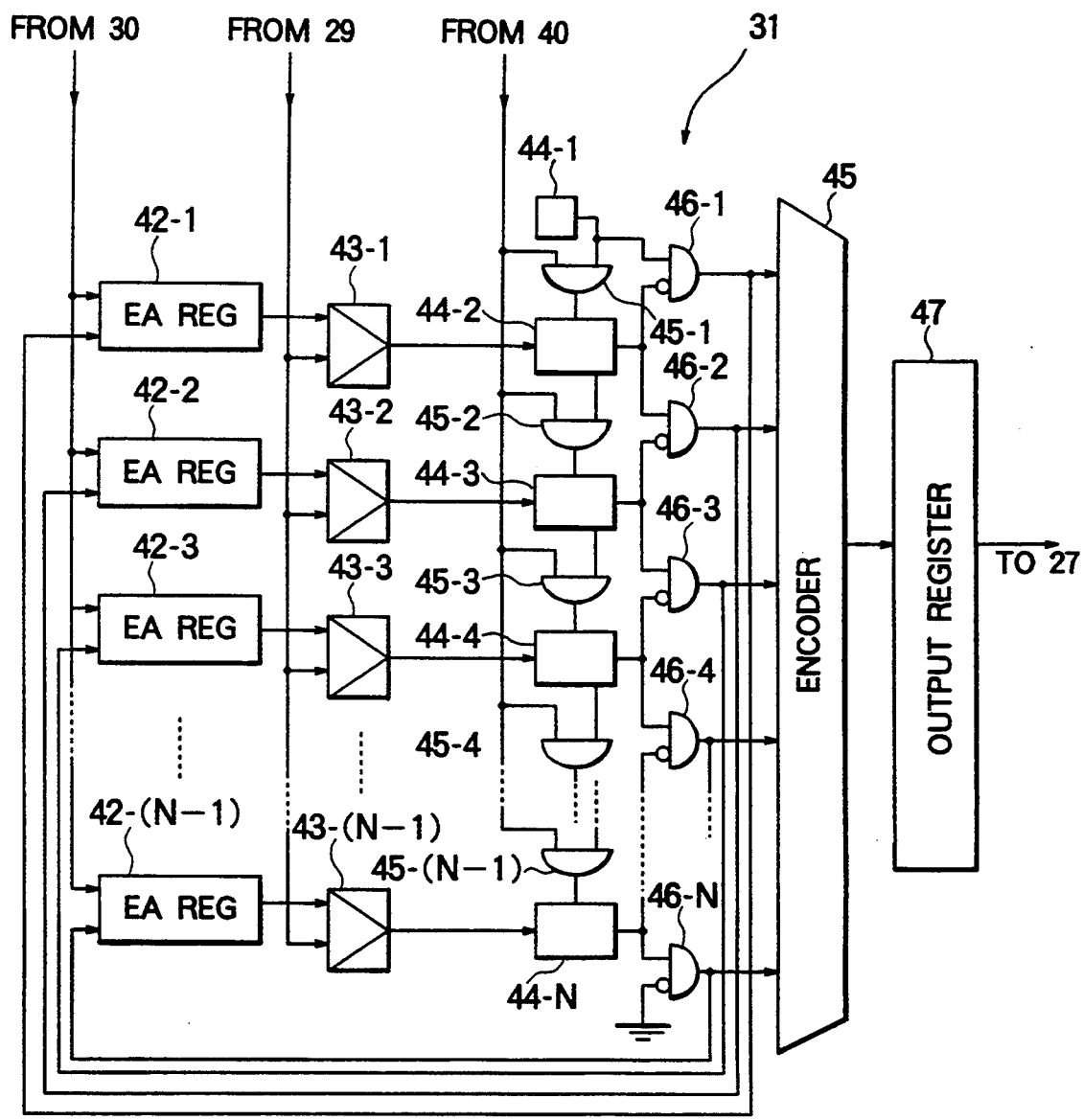
FIG. 4 is a block diagram of a nest level decision circuit for use in the token train retrieval device depicted in FIG. 2.

Referring to FIG. 4, the nest level decision circuit 31 comprises first through (N-1)-th end address (EA) registers 42-1, 42-2, 42-3, ..., and 42-(N-1). The first through the (N-1)-th end address registers 42-1 to 42-(N-1) are connected to the end address calculating circuit 30 in common to be supplied with the calculated address. The first through the (N-1)-th end address registers 42-1 to 42-(N-1) are further supplied with first through (N-1)-th input signals which become clear later. The first through the (N-1)-th end address registers 42-1 to 42-(N-1) holds, as first through (N-1)-th held addresses, the calculated address when the first through the (N-1)-th input signals are put into the active state, respectively.

The first through the (N-1)-th end address registers 42-1 to 42-(N-1) are connected to first through (N-1)-th address comparators 43-1, 43-2, 43-3, ..., and 43-(N-1), respectively. The first through the (N-1)-th address comparators 43-1 to 43-(N-1) are connected to the intra-train address generating circuit 29 in common. The first through the (N-1)-th address comparators 43-1 to 43-(N-1) compares the intra-train address with the first through the (N-1)-th held addresses. The first through the (N-1)-th address comparators 43-1 to 43-(N-1) produces first through (N-1)-th reset signals when the intra-train address becomes not less than the first through the (N-1)-th held addresses, respectively.

A first flag bit flip-flop 44-1 produces a first flag bit signal representative of a binary one. The first flag bit flip-flop 44-1 is connected to a second flag bit flip-flop 44-2 through a first AND gate 45-1. The second flag bit flip-flop 44-2 is connected to a third flag bit flip-flop 44-3 through a second AND gate 45-2. The third flag bit flip-flop 44-3 is connected to a fourth flag bit flip-flop 44-4 through a third AND gate 45-3. Similarly, the fourth flag bit flip-flop 44-4 is connected to a fifth flag bit flip-flop (not shown) through a fourth AND gate 45-4. An (N-1)-th flag bit flip-flop (not shown) is connected to an N-th flag bit flip-flop 44-N through an (N-1)-th AND gate 45-(N-1). That is, the first through the N-th flag bit flip-flops 44-1 to 44-N are connected to one another in cascade through the first through the (N-1)-th AND gates 45-1 to 45-(N-1). The second through the N-th flag bit flip-flops 44-2 to 44-N are connected to the first through the (N-1)-th address comparators 43-1 to 43-(N-1), respectively. The second through the N-th flag bit flip-flops 44-2 to 44-N are connected to the nest bit register 40 (FIG. 4) of the header register 26 through the first through the (N-1)-th AND gates 45-1 to 45-(N-1).

The second flag bit flip-flop 44-2 produces a second flag bit signal representative of the binary one when the nest bit register 40 produces the held nest bit representative of the binary one furthermore when the first flag bit flip-flop 44-1 produces the first flag bit signal of the binary one. Similarly, the third flag bit flip-flop 44-3 produces a third flag bit signal representative of the binary one when the nest bit register 40 produces the held nest bit representative of the binary one furthermore when the second flag bit flip-flop 44-2 produces the second flag bit signal of the binary one. Likewise, the N-th flag bit flip-flop 44-N produces an N-th flag bit signal representative of the binary one when the nest bit register 40 produces the held nest bit representative of the binary one furthermore when an (N-1)-th flag bit flip-flop (not shown) produces an (N-1)-th flag bit signal of the binary One.

The first through the N-th flag bit flip-flops 44-1 are connected to an encoder 45 through first through N-th inhibit gates 46-1, 46-2, 46-3, 46-4, ..., and 46-N. More specifically, the first inhibit gate 46-1 is supplied with the first flag bit signal directly and with the second flag bit signal through an inhibit terminal indicated by a white circle. Supplied with the first flag bit signal of the binary one and the second flag bit signal of the binary zero, the first inhibit gate 46-1 produces a first gate signal having the binary one. Likewise, the second inhibit gate 46-2 produces a second gate signal of the binary one on reception of the second flag bit signal of the binary one and the third flag bit signal of the binary zero. This applies to the third through the N-th inhibit gates 46-3 to 46-N. At any rate, the first through the N-th inhibit gates 46-1 to 46-N produce the first through the N-th gate signals, respectively. Supplied with the first through the N-th gate signals, the encoder 45 encodes the first through the N-th gate signals into an encoded signal. At any rate, the encoder 45 encodes, in cooperation with the first through the N-th inhibit gates 46-1 to 46-N, the first through the N-th flag bit signals into the encoded signal.

Figure 5:
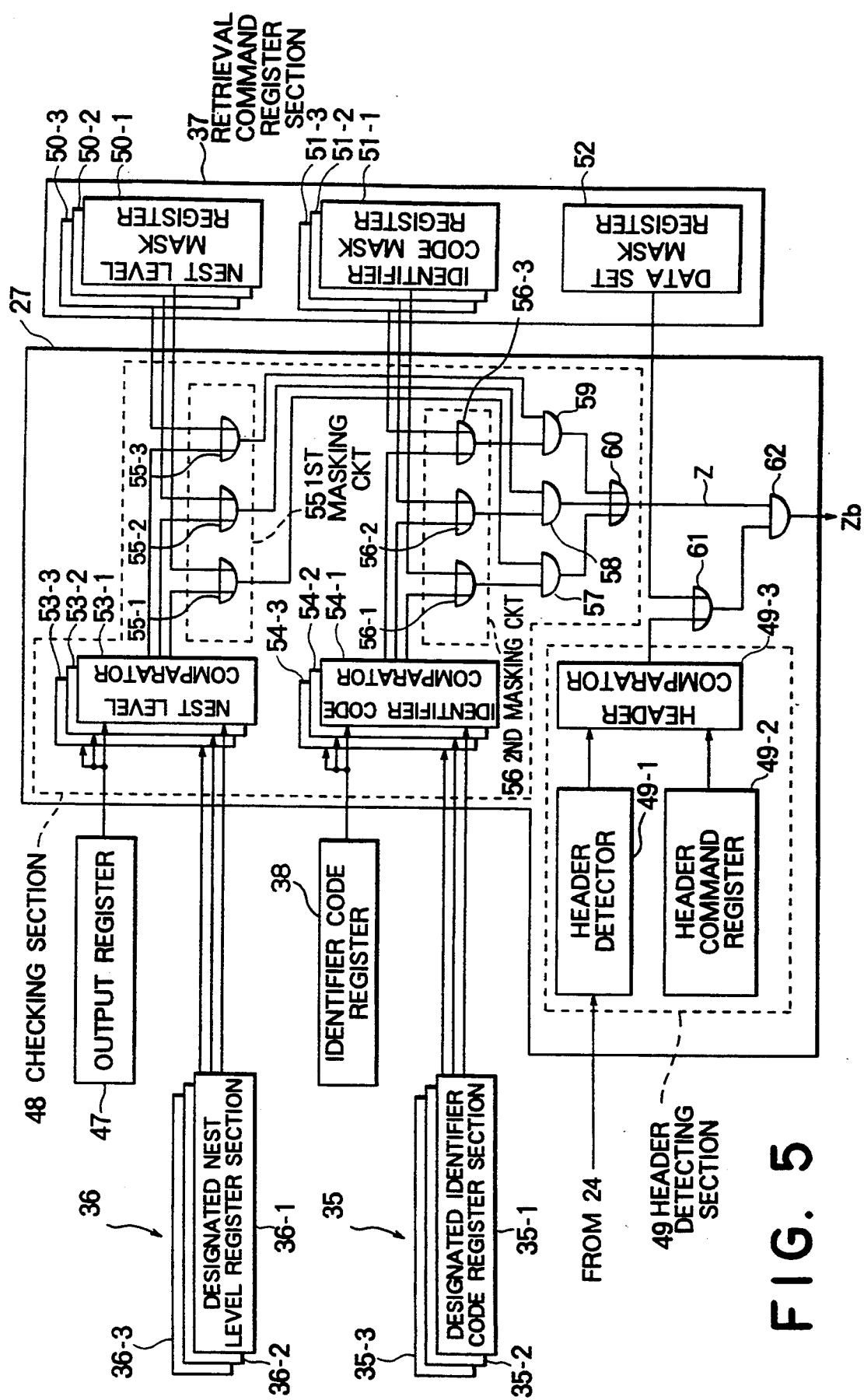
FIG. 5 is a block diagram for describing an example of a checking circuit for use in the token train retrieval device depicted in FIG. 2.

Referring to FIG. 5, the checking circuit 27 comprises a checking section 48 and a header detecting section 49. The checking section 48 is connected to the designated identifier code register section 35, the designated nest level register section 36, and the retrieval command register section 37.

The designated identifier code register section 35 comprises a plurality of designated identifier code registers 35-1 to 35-M, where M represents a positive number which is not less than one. In the illustrated example, the positive number M is equal to three. Namely, the designated identifier code register section 35 comprises first through third designated identifier code registers 35-1 to 35-3. The first through the third designated identifier code registers 35-1 to 35-3 hold first through third designated identifier codes, respectively. The first through the third designated identifier codes are different from one another.

Similarly, the designated nest level register section 36 comprises first through N-th designated nest level registers 36-1 to 36-N. In the illustrated example, the positive integer N is equal to three. The first through the third designated nest level registers 36-1 to 36-3 hold the first through the third designated nest levels, respectively. The first through the third designated nest levels are different from one another.

The retrieval command register section 37 comprises first through third nest level mask registers 50-1 to 50-3, first through third identifier code mask registers 51-1 to 51-3, and a data set mask register 52. The first through the third nest level mask registers 50-1 to 50-3 hold first through third nest level mask bits, respectively. The first through the third identifier code mask registers 51-1 to 51-3 hold first through third identifier code mask bits, respectively. The data set mask register 52 holds a data set mask bit.

The checking section 48 comprises first through third nest level comparators 53-1 to 53-3 and first through third identifier code comparators 54-1 to 54-3. The first nest level comparator 53-1 compares the first designated nest level code with the decided nest level code to produce a first nest level comparison signal. In the illustrated example, the first nest level comparator 53-1 produces the first nest level comparison signal of the binary one when the first designated nest level code matches with the decided nest level code. Otherwise, the first nest level comparator 53-1 produces the first nest level comparison signal of the binary zero.

The second nest level comparators 53-2 produces a second nest level comparison signal of the binary one when the second designated nest level code matches with the decided nest level code. Otherwise, the second nest level comparator 53-2 produces the second nest level comparison signal of the binary zero.

Similarly, the third nest level comparators 53-3 produces a third nest level comparison signal of the binary one when the third designated nest level code matches with the decided nest level code. Otherwise, the third nest level comparator 53-3 produces the third nest level comparison signal of the binary zero.

The first identifier code comparator 54-1 compares the first designated identifier code with the held data identifier code to produce a first identifier code comparison signal. In the illustrated example, the first identifier code comparator 54-1 produces the first identifier code comparison signal of the binary one when the first designated identifier code matches with the held data identifier code. Otherwise, the identifier code comparator 54-1 produces the first identifier code comparison signal of the binary zero.

The second identifier code comparators 54-2 produces a second identifier code comparison signal of the binary one when the second designated identifier code matches with the held data identifier code. Otherwise, the second identifier code comparator 54-2 produces the second identifier code comparison signal of the binary zero.

Similarly, the third identifier code comparators 53-3 produces a third identifier code comparison signal of the binary one when the third designated identifier code matches with the third identifier code. Otherwise, the third nest level comparator 54-3 produces the third identifier code comparison signal of the binary zero.

The first through the third nest level comparators 53-1 to 53-3 are connected to a first masking circuit 55. The first masking circuit 55 is supplied with the first through the third nest level mask bits from the first through the third nest level mask registers 50-1 to 50-3, respectively. The first masking circuit 55 is for masking the first through the third nest level comparison signals by using the first through the third nest level mask bits to produce first through third masked nest level signals.

More particularly, the first masking circuit 55 comprises first through third nest level OR gates 55-1 to 55-3. Supplied with the first nest level comparison signal and the first nest level mask bit, the first nest level OR gate 55-1 produces a first nest level OR'ed signal as the first masked nest level signal. Supplied with the second nest level comparison signal and the second nest level mask bit, the second nest level OR gate 55-2 produces a second nest level OR'ed signal as the second masked nest level signal. Supplied with the third nest level comparison signal and the third nest level mask bit, the third nest level OR gate 55-3 produces a third nest level OR'ed signal as the second masked nest level signal.

The first through the third identifier code . comparators 54-1 to 54-3 are connected to a second masking circuit 56. The second masking circuit 56 is supplied with the first through the third identifier code mask bits from the first through the third identifier code mask registers 51-1 to 51-3, respectively. The second masking circuit 56 is for masking the first through the third identifier code comparison signals by using the first through the third identifier code mask bits to produce first through third masked identifier code signals.

More particularly, the second masking circuit 56 comprises first through third identifier code OR gates 56-1 to 56-3. Supplied with the first identifier code comparison signal and the first identifier code mask bit, the first identifier code OR gate 56-1 produces a first identifier code OR'ed signal as the first masked identifier code signal. Supplied with the second identifier code comparison signal and the second identifier code mask bit, the second identifier code OR gate 56-2 produces a second identifier code OR'ed signal as the second masked identifier code signal. Supplied with the third identifier code comparison signal and the third identifier code mask bit, the third identifier code OR gate 56-3 produces a third identifier code OR'ed signal as the second masked identifier code signal.

The first and the second masking circuits 55 and 56 are connected to first through third AND gates 57 to 59. The first AND gate 57 is supplied with the first masked nest level signal and the first masked identifier code signal. The second AND gate 58 is supplied with the second masked nest level signal and the second masked identifier code signal. The third AND gate 59 is supplied with the third masked nest level signal and the third masked identifier code signal. The first through the third AND gates 57 to 59 produces first through third AND'ed signals to deliver the first through the third AND'ed signals to a first OR gate 60. The first OR gate 60 produces a first OR'ed signal as a checked signal Z.

The header detecting section 49 comprises a header detector 49-1 and a header command register 49-2. The header detector 49-1 is connected to the memory device 24 and is for detecting the supplied header to produce a header detection signal of the binary one when the supplied header is detected. The header command register 49-2 preliminarily holds a header command signal indicative of a header command. The header command register 49-2 holds the header command signal of the binary one when the header is demanded.

The header detecting section 49 further comprises a header comparator 49-3. Supplied with the header command signal and the header detection signal, the header comparator 49-3 compares the header command signal with the header detection signal to produce a header comparison signal representing whether or not the header command signal matches with the header detection signal. More particularly, the header comparator 49-3 produces the header comparison signal of the binary one when the header command signal matches with the header detection signal. Otherwise, the header comparator 49-3 produces the header comparison signal of the binary zero.

The header detecting section 49 is connected to a second OR gate 61. The second OR gate 61 is connected to the data set mask register 52. Supplied with the header comparison signal and the data set mask bit, the second OR gate 61 produces a second OR'ed signal.

The first and the second OR gates 60 and 61 are connected to a fourth AND gate 62. Supplied with the first and the second OR'ed signals, the fourth AND gate 62 produces a fourth AND'ed signal as the matching signal Zb.

Figure 6:
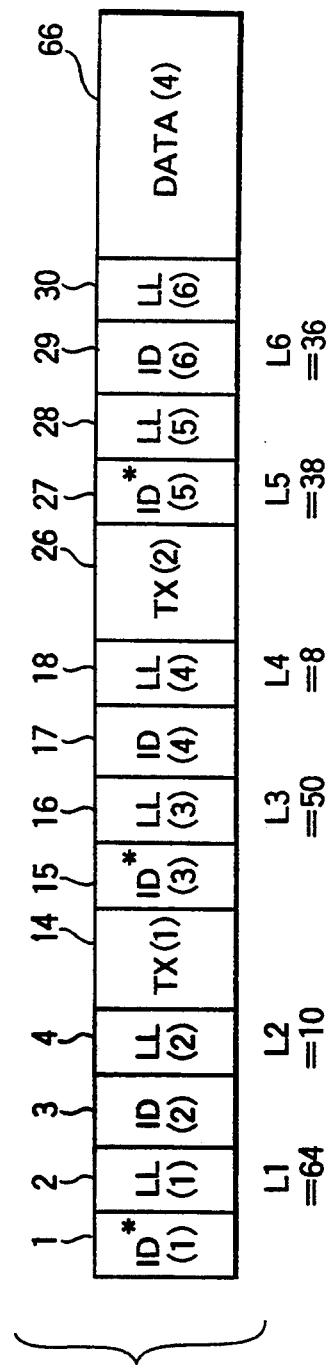
FIG. 6 shows an example of tokens memorized in a memory device for use in the token train retrieval device depicted in FIG. 2.
Figure 7:
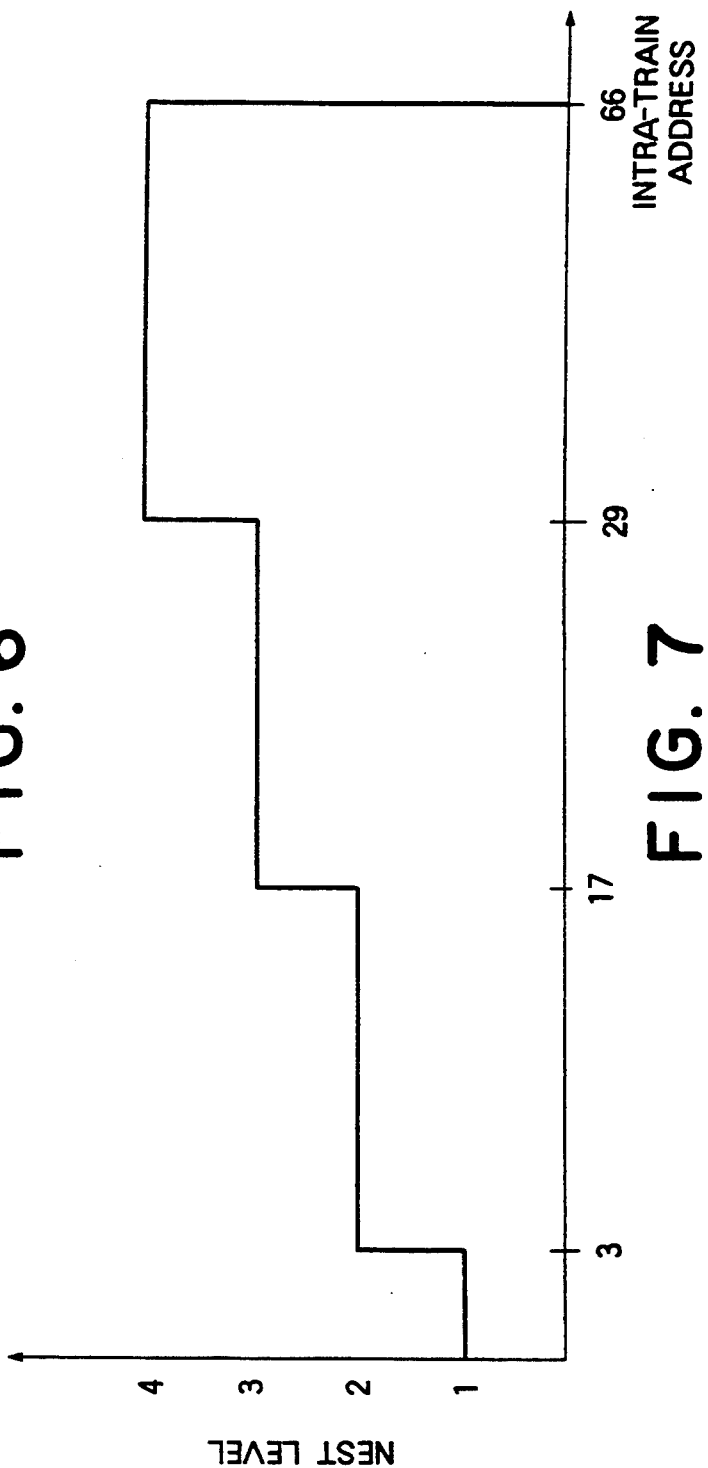
FIG. 7 is a graphical representation for use in describing variation of a nest level.

Referring to FIGS. 6 and 7, the description will be made as regards relation between the intra-train address and the nest level. For the example being illustrated, the predetermined natural number N is equal to four. The initial address is equal to an address of a first octet. Therefore, the access address is equal to the intra-train address. The intra-train addresses are indicated along a first or top line in FIG. 9 by numerals 1 through 66. It will be assumed that the token train retrieval device is supplied with a token train as shown along a second line from the top in FIG. 9.

The illustrated token train has a size equal to sixty-six octets and comprises first through sixth tokens. The first through the sixth tokens are memorized in the memory device 24 (FIG. 2) as first through sixth stored tokens which starts at the initial address of the first octet and ends at a final address of a sixty-sixth octet.

The first stored token is the constructor token having the first nest level of level one and has a first header and a first data set. The first header has a first identifier code ID*(1) including the nest bit of the binary one and has a first data length code LL(1) indicative of a first length L1 which is equal to sixty-four octets. The first header has a first header length LH1 equal to two octets. The first stored token starts at a first starting address equal to the initial address and ends at a first end address equal to the final address. Inasmuch as the first token is the constructor token, the second through the sixth tokens are nested in the first data set.

The second stored token is the primitive token and has a second header and a second data set depicted at TX(1). The second header has a second identifier code ID(2) including the nest bit of the binary zero and has a second data length code LL(2) indicative of a second length L2 which is equal to ten octets. The second stored token starts at a second starting address of a third octet and ends at a second end address of a fourteenth octet. Inasmuch as the second token is the primitive token, no token is nested in the second data set.

The third stored token is the constructor token and has a third header and a third data set. The third header has a third identifier code ID*(3) including the nest bit of the binary one and has a third data length code LL(3) indicative of a third length L3 which is equal to fifty octets. The third header has a third header length LH2 equal to two octets. The third stored token starts at a third starting address of fifteenth octet and ends at a third end address equal to the final address. Inasmuch as the third token is the constructor token, the fifth and the sixth tokens are nested in the third data set.

The fourth stored token is the primitive token and has a fourth header and a fourth data set depicted at TX(2). The fourth header has a fourth identifier code ID(4) including the nest bit of the binary zero and has a fourth data length code LL(4) indicative of a fourth length L4 which is equal to eight octets. The fourth stored token starts at a fourth starting address of a seventeenth octet and ends at a fourth end address of a twenty-sixth octet. Inasmuch as the fourth token is the primitive token, no token is nested in the fourth data set.

The fifth stored token is the constructor token and has a fifth header and a fifth data set. The fifth header has a fifth identifier code ID*(5) including the nest bit of the binary one and has a fifth data length code LL(5) indicative of a fifth length L5 which is equal to thirty-eight octets. The fifth header has a fifth header length LH5 equal to two octets. The fifth stored token starts at a fifth starting address of a twenty-seventh octet and ends at a fifth end address equal to the final address. Inasmuch as the fifth token is the constructor token, the sixth token is nested in the fifth data set.

The sixth stored token is the primitive token and has a sixth header and a sixth data set depicted at DATA(4). The sixth header has a sixth identifier code ID(6) including the nest bit of the binary zero and has a sixth data length code LL(6) indicative of a sixth length L6 which is equal to thirty-six octets. The sixth stored token starts at a sixth starting address of a twenty-ninth octet and ends at a sixth end address equal to the final address. Inasmuch as the sixth token is the primitive token, no token is nested in the sixth data set.

As shown in FIG. 7, the decided nest level is shifted from the first nest level of level one to the second nest level of level two when the intra-train address reaches the second starting address of the third octet. The decided nest level is shifted from the second nest level of level two to the third nest level of level three when the intra-train address reaches the fourth starting address of the seventeenth octet. When the intra-train address reaches the sixth starting address of the twenty-ninth octet, the decided nest level is shifted from the third nest level to the fourth nest level of level four. The decided nest level is shifted from the fourth nest level to the first nest level without fail when the intra-train address reaches the final address of the sixty-sixth octet.

Figure 8:
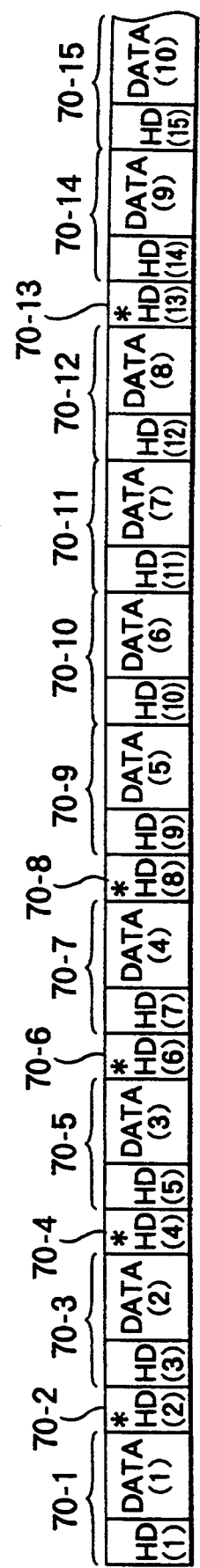
FIG. 8 shows another example of a token train having tokens having different nest levels.
Figure 9:
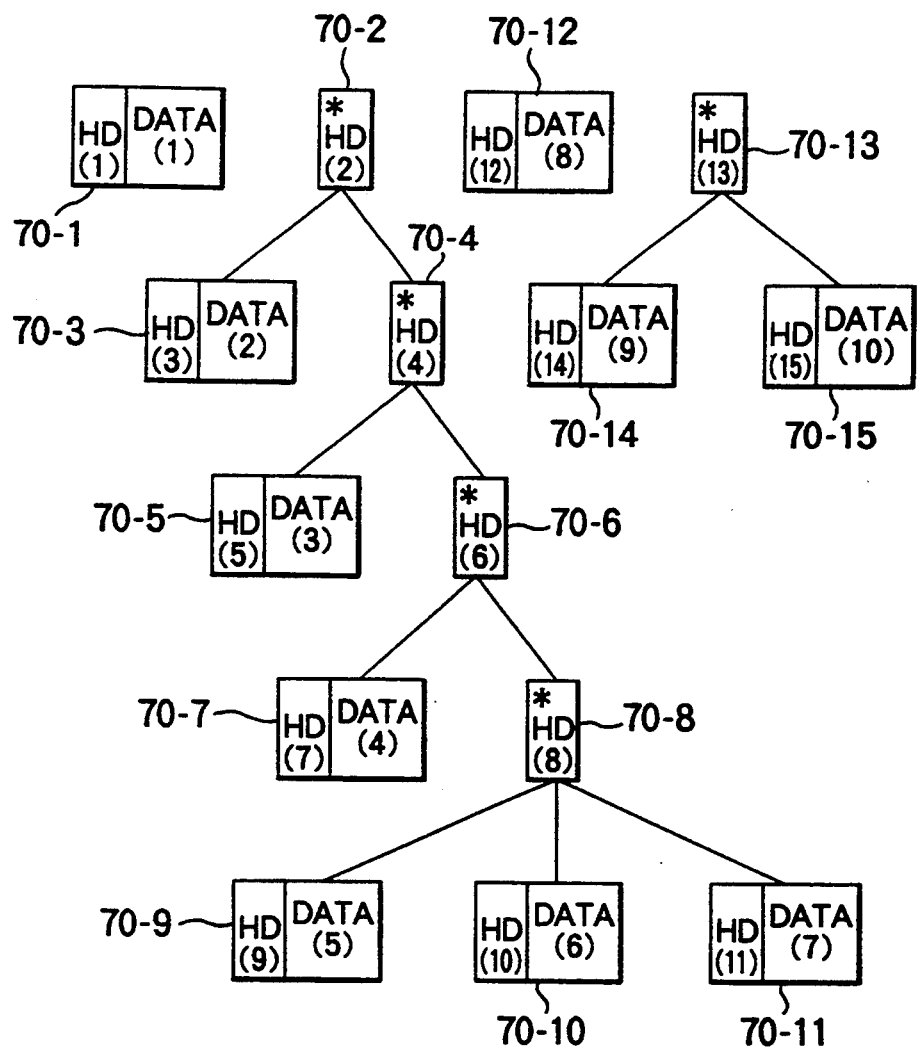
FIG. 9 is a view for describing relationship of each token illustrated in FIG. 8.

Referring to FIGS. 8 and 9, description will be made as regards operation of the token train retrieval device illustrated in FIG. 2. It will be presumed that the memory device 24 memorizes the token train exemplified in FIG. 8. For the example being illustrated, the predetermined natural number N is equal to five. The illustrated token train comprises first through fifteenth tokens 70-1 to 70-15. Each of the first through the fifteenth tokens 70-1 to 70-15 comprises the header and the data set. When one of the tokens is the constructor token, the header is depicted at HD* (suffixes omitted). When one of the tokens is the primitive token, the header is depicted at HD (suffixes omitted). Therefore, each of the second, the fourth, the sixth, the eighth, the thirteenth tokens 70-2, 70-6, 70-8, 70-13 is the constructor token. Each of the remaining token in the token train is the primitive token.

Reviewing FIG. 9, the first, the second, the twelfth, and the thirteenth tokens 70-1, 70-2, 70-12, and 70-13 have the nest level of one. Inasmuch as the second token 70-2 is the constructor token, the second token 70-2 nests the third and the fourth tokens 70-3 and 70-4. Inasmuch as the thirteenth token 70-13 is the constructor token, the thirteenth token 70-13 nests the fourteenth and the fifteenth tokens 70-14 and 70-15. The third, the fourth, the fourteenth, and the fifteenth tokens 70-3, 70-4, 70-14, and 70-15 have the nest level of two. Inasmuch as the fourth token 70-4 is the constructor token, the fourth token 70-4 nests the fifth and the sixth tokens 70-5 and 70-6. The fifth and the sixth tokens 70-5 and 70-6 have the nest level of three. Inasmuch as the sixth token 70-6 is the constructor token, the sixth token 70-6 nests the seventh and eighth tokens 70-7 and 70-8. The seventh and the eighth tokens 70-7 and 70-8 have the nest level of four. Inasmuch as the eighth token 70-8 is the constructor, the eighth token 70-8 nests the ninth, tenth, and the eleventh tokens 70-9, 70-10, and 70-11. The ninth, tenth, and the eleventh tokens 70-9, 70-10, and 70-11 have the nest level of five.

In case of retrieving the seventh and the tenth tokens 70-7 and 70-10 in the token train illustrated in FIG. 8, the retrieval command register section 37 (FIG. 2) appoints the designated nest level and the designated identifier code which indicate the seventh token 70-7. Furthermore, the retrieval command register section 37 (FIG. 2) appoints the designated nest level and the designated identifier code which indicate the tenth token 70-10. As a result, the checking circuit 29 (FIG. 2) produces the matching signal twice in one retrieval operation in order to retrieve the seventh and the tenth tokens 70-7 and 70-10. Namely, the token train retrieval device illustrated in FIG. 2 can retrieve a plurality of tokens in one retrieval operation.

Figure 10:
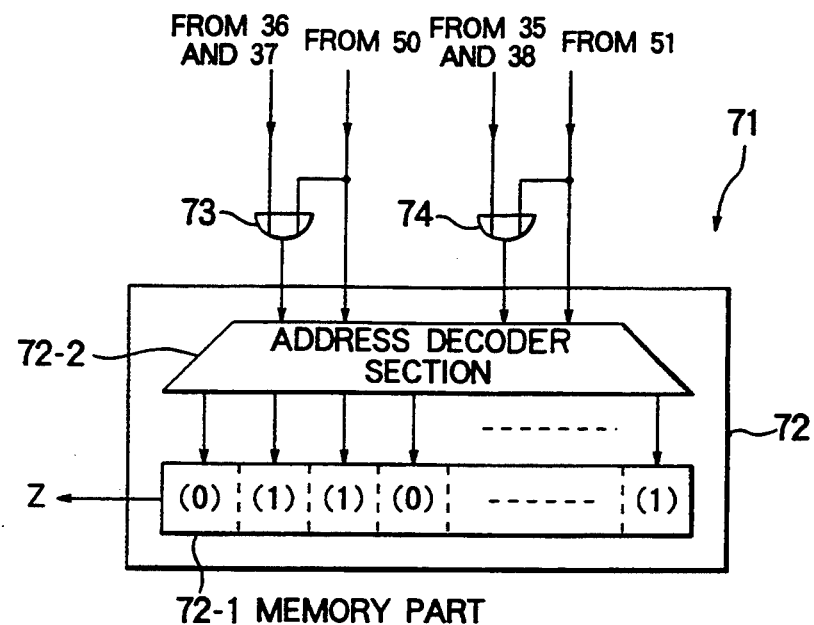
FIG. 10 is a block diagram for describing another example of a checking circuit for use in the token train retrieval device illustrated in FIG. 2.

Referring to FIG. 10, description will be made as regards another example of a checking circuit. The checking circuit is similar in structure to that described in conjunction with FIG. 5 except that the checking circuit comprises a checking section which is different from the checking section 48 illustrated in FIG. 5. In FIG. 10, the illustrated checking section is different in structure from the checking section 48 illustrated in FIG. 5 and is therefore designated afresh by a reference numeral 71. The checking section 71 comprises a memory section 72 which may be, for example, an IC memory. The memory section 72 comprises a memory part 72-1 and an address decoder section 72-2.

The memory section 71 is selectively connected through OR gates 73-1 and 73-2 to the designated identifier code register section 35, the designated nest level register section 36, the nest level mask registers 50 (suffixes omitted), and the identifier code mask registers 51 (suffixes omitted) each of which is illustrated in FIG. 5. The OR gate 73-1 masks the first through the N-th designated nest levels by the first through the N-th nest level mask signals to produce first through N-th nest level masked signals, respectively. The OR gate 73-2 masks the first through the M-th designated identifier codes by the first through the M-th identifier code mask signals to produce first through M-th identifier code masked signals, respectively. In the illustrated example, the positive integer N is equal to the positive number M.

The memory part 72-1 is at first set into an initial state, for example, the binary zero. Responsive to the first through the N-th nest level masked signals and the first through the N-th identifier code masked signals, the address decoder section 72-2 produces first through N-th address signals. The address decoder section 72-2 is supplied with the first through the N-th nest level mask bits and the first through the N-th identifier code mask bits. The address decoder section 72-2 accesses to the memory part 72-1 in accordance with the first through the N-th address signals to write first through N-th data bits in accordance with the first through the N-th nest level mask bits and the first through the N-th identifier code mask bits. Each of the first through the N-th data bits represents either one of the binary one and the binary zero as illustrated in FIG. 10.

The address decoder section 72-2 is supplied with the decided nest level code and the held data identifier code through the OR gates 73-1 and 73-2, respectively. Responsive to the decided nest level code and the held data identifier code, the address decoder section 72-2 produces a decided address signal to read one of the first through the N-th data bits as the checked signal Z out of the memory part 72-1.

Figure 11:
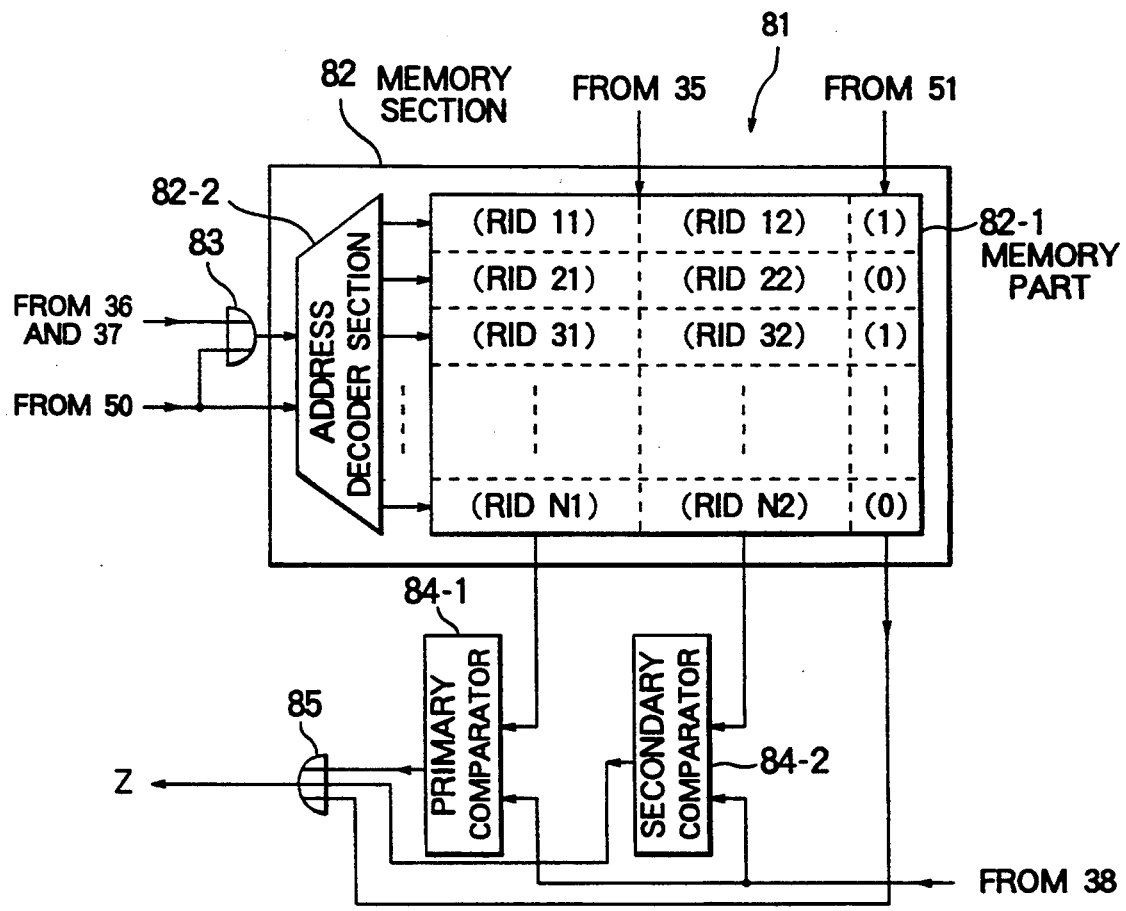
FIG. 11 is a block diagram for describing still another example of a checking circuit for use in the token train retrieval device depicted in FIG. 2.

Referring to FIG. 11, description will be made as regards still another example of a checking circuit. The checking circuit is similar in structure to that described in conjunction with FIG. 5 except that the checking circuit comprises a checking section which is different from the checking section 48 illustrated in FIG. 5. In FIG. 11, the illustrated checking section is different in structure from the checking section 48 illustrated in FIG. 5 and is therefore designated afresh by a reference numeral 81. The checking section 81 comprises a memory section 82 which may be, for example, an IC memory. The memory section 82 comprises a memory part 82-1 and an address decoder section 82-2.

The memory section 81 is selectively connected through an OR gate 83 to the designated nest level register section 36 and the nest level mask registers 50 (suffixes omitted) each of which is illustrated in FIG. 5. The OR gate 83 masks the first through the N-th designated nest levels by the first through the N-th nest level mask signals to produce first through N-th nest level masked signals. Supplied with first through N-th nest level masked signals and the first through the N-th nest level mask bits, the address decoder section 82-2 produces the first through the N-th address signal.

The memory part 82-1 is at first set into an initial state, for example, the binary zero. Responsive to the first through the N-th address signals, the first through the M-th designated identifier codes are memorized as the first through the M-th memorized identifier codes in the memory part 82-1. In the illustrated example, the positive integer N is equal to the positive number M. Furthermore, the first through the N-th identifier code mask bits are memorized as first through N-th memorized identifier bits in the memory part 82-1. In the illustrated example, each of the first through the N-th memorized identifier codes has primary and secondary portions. Namely, the first memorized identifier code has a first primary portion RID11 and a first secondary portion RID12. The second memorized identifier code has a second primary portion RID22 and a second secondary portion RID22. The third memorized identifier code has a third primary portion RID31 and a third secondary portion RID32. Similarly, the N-th memorized identifier code has a N-th primary portion RIDN1 and a N-th secondary portion RIDN2. Each of the first through the N-th memorized identifier bits has either one of the binary one and the binary zero as illustrated in FIG. 11.

The address decoder section 82-2 is supplied with the decided nest level code through the OR gate 83. Responsive to the decided nest level code, the address decoder section 82-2 produces a decided address signal to read one of the first through the N-th memorized identifier codes and one of the first through the N-th memorized identifier bits as a selected identifier code and a selected identifier bit, respectively. The selected identifier code has a selected primary portion and a selected secondary portion.

The selected primary portion is delivered to a primary comparator 84-1. The selected secondary portion is delivered to a secondary comparator 84-2. The primary and the secondary comparators 84-1 and 84-2 are supplied with the held identifier code. The primary comparator 84-1 compares the selected primary portion with the held identifier code to produce a primary comparison signal. The secondary comparator 84-2 compares the selected secondary portion with the held identifier code to produce a secondary comparison signal. More specifically, the primary comparator 84-1 produces the primary comparison signal of the binary one when the selected primary portion matches with the held identifier code. Otherwise, the primary comparator 84-1 produces the primary comparison signal of the binary zero. Similarly, the secondary comparator 84-2 produces the secondary comparison signal of the binary one when the selected secondary portion matches with the held identifier code. Otherwise, the secondary comparator 84-2 produces the secondary comparison signal of the binary zero.

The primary and the secondary comparison signals are delivered to an OR gate 85. Furthermore, the selected identifier bit is supplied with the OR gate 85. The OR gate 85 produces an OR'ed signal as the checked signal Z. More particularly, the OR gate 85 produces the checked signal Z of the binary one when each of the primary and the secondary comparison signals and the selected identifier bit has the binary one.

Figure 12:
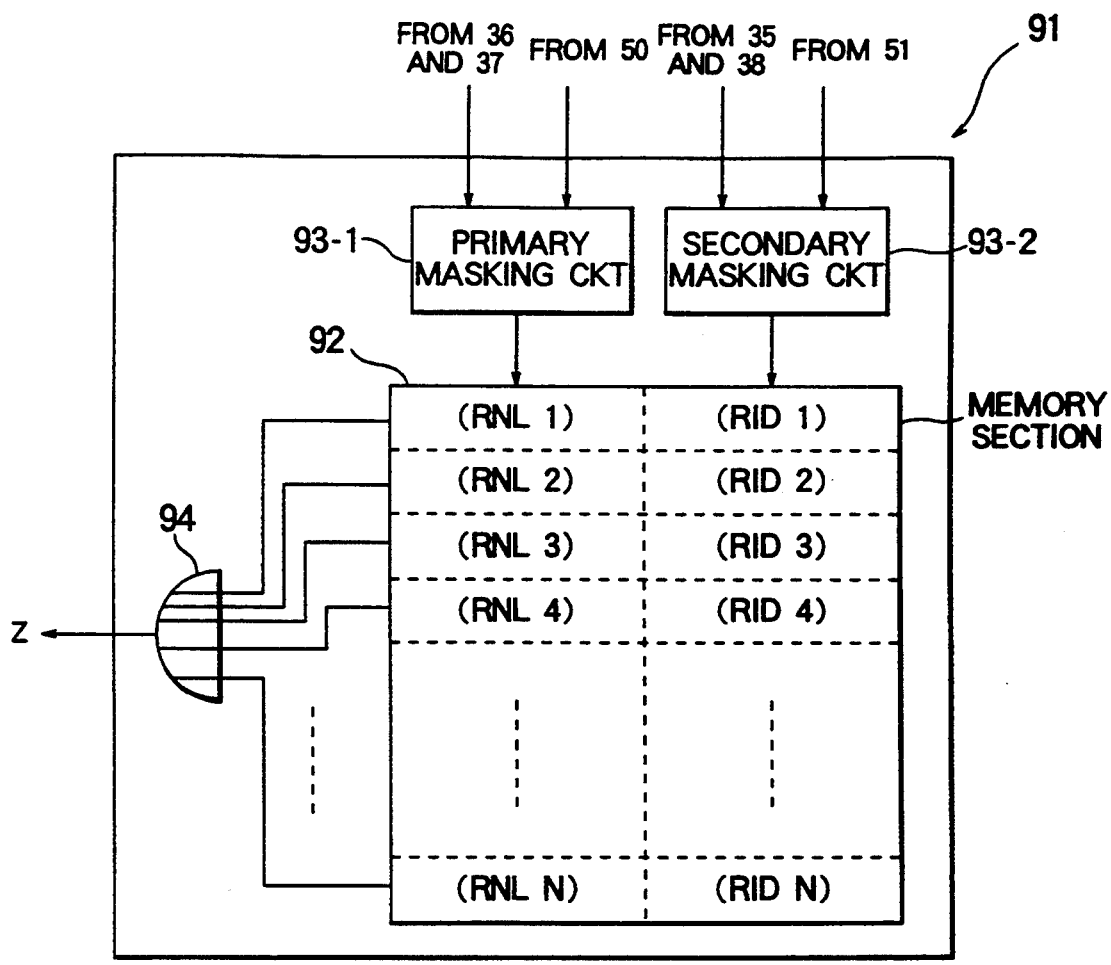
FIG. 12 is a block diagram for describing yet another example of a checking circuit for use in the token train retrieval device depicted in FIG. 2.

Referring to FIG. 12, description will be made as regards yet another example of a checking circuit. The checking circuit is similar in structure to that described in conjunction with FIG. 5 except that the checking circuit comprises a checking section which is different from the checking section 48 illustrated in FIG. 5. In FIG. 12, the illustrated checking section is different in structure from the checking section 48 illustrated in FIG. 5 and is therefore designated afresh by a reference numeral 91. The checking section 91 comprises a memory section 92 which may be, for example, an IC memory.

The memory section 92 is selectively connected through primary and secondary masking circuits 93-1 and 93-2 to the designated identifier code register section 35, the designated nest level register section 36, the nest level mask registers 50 (suffixes omitted), and the identifier code mask registers 51 (suffixes omitted) each of which is illustrated in FIG. 5. The primary masking circuit 93-1 masks the first through the N-th designated nest levels by the first through the N-th nest level mask signals to produce first through N-th nest level masked signals, respectively. The secondary masking circuit 93-2 masks the first through the M-th designated identifier codes by the first through the M-th identifier code mask signals to produce first through M-th identifier code masked signals, respectively. In the illustrated example, the positive integer N is equal to the positive number M.

The memory section 92 memorizes the first through the N-th nest level masked signals as first through N-th memorized nest level data RNL1 to RNLN. The memory section 92 memorizes the first through the N-th identifier code masked signals as first through N-th memorized identifier data RID1 to RIDN. Each of the first through the N-th memorized nest level data RNL1 to RNLN represents either one of the binary one and the binary zero. Each of the first through the N-th memorized identifier data RID1 to RIDN represents either one of the binary one and the binary zero.

Supplied with the decided nest level code as a nest level address signal, one of the first through the N-th memorized nest level data RNL1 to RNLN is read as a read nest level data out of the memory section 92. Supplied with the held identifier code as an identifier code address signal, one of the first through the N-th memorized identifier data RID1 to RIDN is read as a read identifier data out of the memory section 92.

The read nest level data and the read identifier data are delivered to an OR gate 94. The OR gate 94 produces an OR'ed signal as the checked signal Z. More particularly, the OR gate 94 produces the signal of the binary one when each of the read nest level data and the read identifier data has the binary one. Otherwise, the OR gate 94 produces the checked signal Z of the binary zero.

What is claimed is:

1. A token train retrieval device including a memory device for memorizing, as stored tokens, a plurality of tokens each of which starts at a starting address and ends at an end address, each of said tokens having a nest level selected from first through N-th nest levels as a selected level, where N represents a positive integer which is not less than one, said first through said N-th nest levels being a lowest through a highest nest level, respectively, each of said tokens comprising a header and a data set, said data set having a data length and being for nesting one of said tokens that has a higher nest level than said selected level, said header comprising a data length code representative of said data length and a data identifier code which includes a nest bit indicative of whether or not said one of the tokens is nested in said data set, said token train retrieval device being for retrieving said stored tokens to locate required data in said stored tokens that satisfy a retrieval condition and comprising:

retrieval condition memory means for preliminarily memorizing said retrieval condition as a stored condition, said stored condition including first through M-th designated identifier codes different from one another and first through N-th designated nest level codes different from one another, where M represents a positive number which is not less than one, each of said designated nest level codes being indicative of a designated nest level as one of said first through said N-th nest levels;

header register means supplied as a supplied header with the header of each of selected tokens selected from said tokens for holding the data length code, the data identifier code, and the nest bit of said supplied header as a held data length code, a held data identifier code, and a held nest bit, respectively;

checking means connected to said retrieval condition memory means and said header register means and supplied with a decided nest level code and said supplied header for checking, in response to said held data identifier code, said decided nest level code, and said supplied header, whether or not said stored condition is satisfied to produce a matching signal indicative of a binary one when the stored condition is satisfied;

intra-train address generating means connected to said checking means and said header register means for generating an intra-train address variable in response to said matching signal and said held data length code to select said selected tokens from said stored tokens, said selected tokens including said required data;

end address calculating means connected to said intra-train address generating means and said header register means for calculating the end address of each of said selected tokens as a calculated address by using said intra-train address and said held data length code; and decision means connected to said intra-train address generating means, said end address calculating means, said header register means, and said checking means for deciding a decided nest level by using said intra-train address, said calculated address, and said held nest bit, said decided nest level indicating one of said first through said N-th nest levels that is selected as said selected level, said decision means supplying said checking means with said decided nest level code representative of said decided nest level.

2. A token train retrieval device as claimed in claim 1, wherein said checking means comprises:

a checking section for checking whether or not said stored condition is satisfied in response to said held data identifier code and said decided nest level code to produce a checked signal when said stored condition is satisfied;

header detecting means supplied with said supplied header for detecting said supplied header to produce a header comparison signal; and supplying means for supplying said matching signal in response to said checked signal and said header comparison signal.

3. A token train retrieval device as claimed in claim 2, wherein said stored condition further includes a retrieval command which designates at least one of said designated identifier codes as a mask identifier signal and at least one of said designated nest level codes as a mask nest level signal.

4. A token train retrieval device as claimed in claim 3, wherein said checking section comprises:

first comparator means for comparing said first through said N-th designated nest level codes with said decided nest level code, respectively, to produce first through N-th nest level comparison signals;

second comparator means for comparing said first through said M-th designated identifier codes with said held identifier code, respectively, to produce first through M-th identifier comparison signals;

first masking means for masking said first through said N-th nest level comparison signals by said mask nest level signal, respectively, to produce first through N-th masked nest level signals;

second masking means for masking said first through said M-th identifier comparison signals by said mask identifier signal, respectively, to produce first through said M-th masked identifier signals;

producing means supplied with said first through said N-th masked nest level signals and said first through said M-th masked identifier signals for producing said checked signal.

5. A token train retrieval device as claimed in claim 3, wherein said header detecting means comprises:

a header detector for detecting said supplied header to produce a header detection signal;

a header command register for holding a header command signal indicative of a header command; and a header comparator for comparing said header detection signal with said header command signal to produce said header comparison signal.

6. A token train retrieval device as claimed in claim 3, wherein said checking section comprises:

producing means supplied with said first through said N-th designated nest level codes, said first through said M-th designated identifier codes, said mask nest level signal, and said mask identifier signal for producing first through N-th data signals which has either a binary one and a binary zero;

memory means for memorizing said first through said N-th data signals as first through N-th memorized bits, respectively; and reading means responsive to said decided nest level code and said held identifier code for reading one of said memorized bits as said checked signals out of said memory means.

7. A token train retrieval device as claimed in claim 3, wherein said checking section comprises:

first producing means supplied with said first through said N-th designated nest level codes and said mask nest level signal for producing first through N-th address signals;

memory means responsive to said first through said N-th address signals for memorizing said first through said M-th designated identifier codes and said mask identifier signal as first through N-th memorized identifier codes and a memorized mask signal, respectively;

reading means responsive to said decided nest level code for reading one of said memorized identifier codes and said memorized mask signal as a read identifier code and a read mask signal out of said memory means;

comparator means for comparing said read identifier code with said held identifier code to produce a comparison signal of a binary one when said read identifier code matches with said held identifier code; and second producing means supplied with said comparison signal and said read mask signal for producing said checked signal.

8. A token train retrieval device as claimed in claim 3, wherein said checking section comprises:

first masking means for masking said first through said N-th designated nest level codes by said mask nest level signal, respectively, to produce first through N-th masked nest level signals;

second masking means for masking said first through said M-th designated identifier codes by said mask identifier signal, respectively, to produce first through M-th masked identifier signals;

memory means for memorizing said first through said N-th masked nest level signals and said first through said M-th masked identifier signals as first through N-th memorized nest level codes and first through M-th memorized identifier codes, respectively;

reading means responsive to said decided nest level code and said held identifier code for reading one of said first through said N-th memorized nest level codes and one of said first through said M-th memorized identifier codes as a read nest level code and a read identifier code, respectively; and producing means supplied with said read nest level code and said read identifier code for producing said checked signal.

* * * * *